Patented Apr. 13, 1937

2,076,563

UNITED STATES PATENT OFFICE 2,076,563

SULPHONATION PRODUCTS OF HYDRO-ABIETYL ALCOHOL AND PROCESS OF PREPARING THE SAME

Clyde O. Henke, Wilmington, Del., and Milton A. Prahl, Milwaukee, Wis., assignors to E. I. du Pont de Nemours & Company, Wilmington, Del., a corporation of Delaware No Drawing. Application September 20, 1933, Serial No. 690,230

14 Claims. (Cl. 260—99.12)

This invention relates to new organic compounds which are useful as wetting, penetrating and emulsifying agents. More particularly, this invention deals with the novel compounds obtained by reacting with sulphonating agents upon hydroabietyl alcohol.

In U. S. Patent 2,021,100, we have disclosed a novel and efficient method of preparing hydroabietyl alcohol. This process, briefly, consists of reducing an ester of hydroabietic acid such as ethyl-hydroabietate, hydrogenated ester gum, and the like, by the aid of a metal such as sodium, in alcoholic solution. Either dihydro- or tetrahydroabietyl alcohol may be prepared by this method.

We have now found that these hydroabietyl alcohols may be converted into sulphuric acid esters by reacting the same with sulphonating agents in an anhydrous medium. The products possess high wetting, penetrating, emulsifying and foaming properties and may be used in the arts of dyeing, cleansing and otherwise wet-treating of textile fiber or leather material. They may also be used in insecticidal sprays, in froth flotation processes, in lubricants, and in other arts or compositions where wetting, emulsifying or foaming agents are of value.

The esterification is best performed with concentrated sulphuric acid in acetic anhydride medium, or with sulphur trioxide gas in inert organic medium, such as tetrachlorethane, trichlorethylene, and the like. Oleum is also suitable, except that in this case some sulphonation in the nucleus takes place as a side reaction. Undoubtedly some sulphonation takes place in the other processes also, but to a negligible extent.

Without limiting our invention to any particular procedure, the following examples, in which parts by weight are given, will serve to illustrate our preferred mode of operation.

Example 1

40 parts of hydroabietyl alcohol, as prepared for instance according to U. S. Patent 2,021,100, are dissolved in 80 parts of acetic anhydride and maintained at a temperature of 10–15° C. while stirring. 60 parts of 100% sulphuric acid are then added drop by drop, during a period of about ½ hour. The mixture is then stirred for 15 hours at a temperature of 10–15° C. The mass is poured onto ice, and is neutralized with 50% sodium hydroxide solution. About 88 parts of sodium hydroxide (on the dry basis) will be required. The total weight at this point should be about 500 parts. 140 parts of sodium chloride are then added with stirring; this causes the separation of the desired compound as a viscous liquid or paste. The water solution is decanted from the paste, and the latter is evaporated to dryness in vacuo at 100° C. If desired, the dried product may be extracted with alcohol; the alcoholic solution is then filtered and evaporated. This purified product is substantially free from inorganic salts and is obtained in high yield.

The product is a yellow solid, readily soluble in water. It possesses good wetting, penetrating, and emulsifying power, and is not precipitated by dilute acids and alkalies, either hot or cold. It is therefore particularly adapted for use as a wetting agent where acid or alkaline treatment is involved. Its formula is most probably Ab—$CH_2$—O—$SO_3Na$, where Ab stands for the hydrocarbon nucleus, $C_{19}H_{31}$ or $C_{19}H_{33}$, of hydroabietic acid. The free acid is much darker in color than the sodium salt, but otherwise very similar to it in physical properties as well as in wetting or dispersing power.

Example 2

52 parts of hydroabietyl alcohol are dissolved in 280 parts of tetrachlorethane, cooled to 0° C., and sulphonated by passing in 28 parts of sulphur trioxide. After all of the sulphur trioxide has been introduced, the mixture is stirred ½ hour longer at 0° C. 500 parts of water are then added and the mixture is neutralized with 50% sodium hydroxide solution. About 25 parts of sodium hydroxide (on the dry basis) will be required. The tetrachlorethane is removed by distillation, and the aqueous solution is evaporated to dryness in vacuo at 100° C. If desired the product may be freed from inorganic salts by extraction with alcohol as described in Example 1. The product is similar to that obtained by the process described in Example 1.

It will be understood that many variations and modifications are possible in our preferred procedure without departing from the spirit of this invention. Thus, the quantities of sulphonating agents used, as well as the temperature employed, may be varied within wide limits. Instead of neutralizing with caustic soda, caustic potash or ammonia may be employed. If desired, concentrated sulphuric acid by itself may be used as sulphonating agent, that is, without the aid of acetic anhydride. Similarly, other sulphonating agents may be employed. In general, it will be understood that our process may be modified along analogous lines with the known processes for converting high-molecular alcohols into the corresponding sulphuric acid esters.

We claim:

1. The sulphuric acid ester of hydroabietyl alcohol.

2. A compound which in the form of free acid has the formula $Ab-CH_2-O-SO_3H$, where Ab stands for the hydrocarbon nucleus of hydroabietic acid.

3. A wetting agent comprising the sulphuric acid ester of hydroabietyl alcohol.

4. A compound of the formula $$Ab-CH_2-O-SO_3Na,$$

where Ab stands for the hydrocarbon nucleus of hydroabietic acid, said compound being when dry a yellow powder, readily soluble in water, dilute acids and dilute alkalies, said compound being further characterized by wetting, penetrating and dispersing powers.

5. The process which comprises reacting with a sulphonating agent upon hydroabietyl alcohol.

6. The process of producing a sulphuric acid ester of hydroabietyl alcohol, which comprises reacting with sulphuric acid upon hydroabietyl alcohol in acetic anhydride solution.

7. The process of producing a sulphuric acid ester of hydroabietyl alcohol, which comprises reacting with sulphur trioxide upon hydroabietyl alcohol dissolved in an inert organic medium.

8. The process of producing a sulphuric acid ester of hydroabietyl alcohol, which comprises reacting with sulphur trioxide upon hydroabietyl alcohol dissolved in tetrachlorethane.

9. The process of producing a wetting agent, which comprises reacting with a sulphonating agent upon hydroabietyl alcohol, neutralizing the reaction mass with an alkali-metal hydroxide, and recovering the salt of hydroabietyl-sulphuric-acid ester.

10. The sulphonation product of a hydrogenated abietyl alcohol.

11. The sulphonation product of dihydroabietyl alcohol.

12. The sulphonation product of tetrahydroabietyl alcohol.

13. A compound having the formula $$Ab-CH_2-O-SO_3-X,$$

where Ab stands for the hydrocarbon nucleus of hydroabietic acid, and X stands for sodium, potassium, or ammonium.

14. The process which comprises reacting with a sulphonating agent upon hydroabietyl alcohol dissolved in an organic solvent.

CLYDE O. HENKE.
MILTON A. PRAHL.